US012775238B2

(12) United States Patent
Winkler

(10) Patent No.: US 12,775,238 B2
(45) Date of Patent: Oct. 27, 2026

(54) SELF-STARTING PROFILE FOR TIMEPIECE ESCAPEMENT

(71) Applicant: ETA SA Manufacture Horlogère Suisse, Grenchen (CH)

(72) Inventor: Pascal Winkler, St-Blaise (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 328 days.

(21) Appl. No.: 18/513,855

(22) Filed: Nov. 20, 2023

(65) Prior Publication Data

US 2024/0192640 A1 Jun. 13, 2024

(30) Foreign Application Priority Data

Dec. 8, 2022 (EP) .................................... 22212186

(51) Int. Cl.

*G04B 15/08* (2006.01)
*G04B 15/14* (2006.01)
*G04B 17/06* (2006.01)

(52) U.S. Cl.

CPC ............. *G04B 15/08* (2013.01); *G04B 15/14* (2013.01); *G04B 17/06* (2013.01)

(58) Field of Classification Search

CPC ......... G04B 15/08; G04B 15/14; G04B 17/06
See application file for complete search history.

(56) References Cited

U.S. PATENT DOCUMENTS 3,538,705 A * 11/1970 Perry ..................... G04B 15/08 368/125
3,628,327 A * 12/1971 Abe ....................... G04B 15/08 74/1.5
12,455,535 B2 * 10/2025 Macé ..................... G04B 3/046
2012/0120774 A1 * 5/2012 Fujieda .................. G04B 15/14 368/131

(Continued)

FOREIGN PATENT DOCUMENTS

CH 1 661 869 A4 11/1971
CH 1 082 672 A4 3/1975

(Continued)

OTHER PUBLICATIONS

Machine Translation of CH702689 (Year: 2011).*

(Continued)

*Primary Examiner* — Edwin A. Leon
*Assistant Examiner* — Jason M Collins
(74) *Attorney, Agent, or Firm* — Oblon, McClelland, Maier & Neustadt, L.L.P.

(57) ABSTRACT

A timepiece escapement mechanism, including a lever and an escapement wheel, the lever being arranged to cooperate with an inertial mass of a mechanical oscillator, and, at pallets carried by or included in the lever, with teeth of the escapement wheel, where the contact between a pallet and an escapement tooth includes at least three zones, a rest zone where the torque is of negative direction, where the angle between the normal to the contact and the radial of the lever is negative, a first zone corresponding to the first half angle (Continued)

of lift where the torque is of positive direction, where the angle ω1 is positive, and a second zone corresponding to the second half angle of lift where the torque is of positive direction, where the angle ω2 is positive.

14 Claims, 3 Drawing Sheets

(56) References Cited

U.S. PATENT DOCUMENTS

| | | | | |
|---|---|---|---|---|
| 2012/0307601 | A1* | 12/2012 | Kruttli | G04B 43/002 368/129 |
| 2015/0301501 | A1* | 10/2015 | Tu | G04B 15/10 368/132 |
| 2020/0064777 | A1* | 2/2020 | Heraud | G04B 15/08 |
| 2023/0106693 | A1* | 4/2023 | Laesser | G04B 15/14 368/131 |

FOREIGN PATENT DOCUMENTS

| | | | |
|---|---|---|---|
| CH | 715356 | A2 | 3/2020 |
| CH | 716 525 | A1 | 2/2021 |
| CN | 110928170 | A | 3/2020 |
| CN | 113495473 | A | 10/2021 |
| CN | 221239192 | U | 6/2024 |
| EP | 0 018 796 | B1 | 11/1984 |
| EP | 3182214 | A1 | 6/2017 |
| JP | 2019-536031 | A | 12/2019 |
| JP | 2021-32882 | A | 3/2021 |
| JP | 2021-514476 | A | 6/2021 |

OTHER PUBLICATIONS

Japanese Office Action Issued Dec. 3, 2024 in Japanese Patent Application No. 2023-203805, 7 pages.

European Search Report issued May 3, 2023 in European Application 22212186.5 filed on Dec. 8, 2022, 3 pages (with English Translation of Categories of Cited Documents).

Office Action dated May 26, 2026 issued in corresponding Chinese patent application No. 202311663671.1 (with English translation).

* cited by examiner

SELF-STARTING PROFILE FOR TIMEPIECE ESCAPEMENT

CROSS-REFERENCE TO RELATED APPLICATION

This application claims priority to European Patent Application No. 22212186.5 filed on Dec. 8, 2022, the entire disclosure of which is hereby incorporated herein by reference.

FIELD OF THE INVENTION

The invention relates to a timepiece escapement mechanism, including at least one lever and at least one escapement wheel, said at least one lever being arranged to cooperate, on the one hand, with an inertial mass of a mechanical oscillator, and subjected, directly or indirectly, to the action of elastic return means included in said mechanical oscillator, and, on the other hand, at pallets carried by or included in said lever, with teeth included in said at least one escapement wheel.

The invention relates to the field of timepiece escapement mechanisms.

BACKGROUND OF THE INVENTION

One of the important properties of a timepiece escapement mechanism is self-starting. This is the ability of the escapement to restart "by itself" after the balance has stopped. There are two situations in which this property is important:

- at the end of the power reserve, the barrel is completely let down and the balance stops. If at this time the barrel is wound by the stem, without moving the watch, it would be appreciated that the escapement restarts, that is to say that it makes the balance oscillate again, without having to move the watch;
- when the barrel is wound, a shock or a sudden acceleration on the watch may momentarily stop the balance, for example in a position close to its rest position. It would be appreciated that the escapement restarts in the case of such a shock or sudden acceleration, that is to say that it cause the balance to oscillate again, without having to move the watch again.

Most known escapements can be roughly divided into two classes:

- potentially self-starting escapements, such as the Swiss lever escapement and the coaxial escapement;
- escapements which are intrinsically non-self-starting, such as the detent escapement, widely used in marine chronometers, or the Robin escapement.

The criterion which allows distinguishing these two classes is whether, when the balance is in its rest position (zero torque of the elastic return means: balance-spring or flexible guide blades), the escapement wheel can be on a rest plane or not. If the escapement wheel is on the rest plane when the balance is in its rest position, then the escapement cannot start by itself.

Most escapements used in wristwatches are potentially self-starting, in particular because of the risk associated with the acceleration: the balance must not be stopped by a shock or sudden acceleration, and must not be able to start oscillating again.

SUMMARY OF THE INVENTION

The invention described here relates to optimising the self-starting of an escapement mechanism that is already potentially self-starting.

For a potentially self-starting escapement to start, the barrel torque must be sufficient to wind the balance-spring, or more generally to overcome the return torque of the oscillator (e.g. rigidity of the flexible guide). This means that when the barrel is almost completely let down, a potentially self-starting escapement does not start by itself. When the barrel is fully wound, the situation depends on the calibre in question: some calibres start by themselves, while others need a little "shaking" to get them to start.

The aim of the invention is to improve the self-starting of calibres that are "potentially self-starting", but whose fully wound barrel torque is not sufficient for the escapement to start on its own.

The invention consists in optimising the shape of the pallet of the lever and/or the tooth of the escapement wheel, to promote self-starting. To achieve this, a particular pallet and/or tooth geometry is created so that the return torque of the oscillator which is directly mounted on the escapement wheel is almost constant over the entire angle of lift.

To this end, the invention relates to a timepiece escapement mechanism.

The invention also includes a horological movement including such an escapement mechanism.

The invention also includes a timepiece, in particular a watch, including at least one such horological movement.

BRIEF DESCRIPTION OF THE DRAWINGS

The aims, advantages and features of the invention will become clearer on reading the following detailed description, with reference to the appended drawings, where.

DETAILED DESCRIPTION OF THE INVENTION

Figure 1:
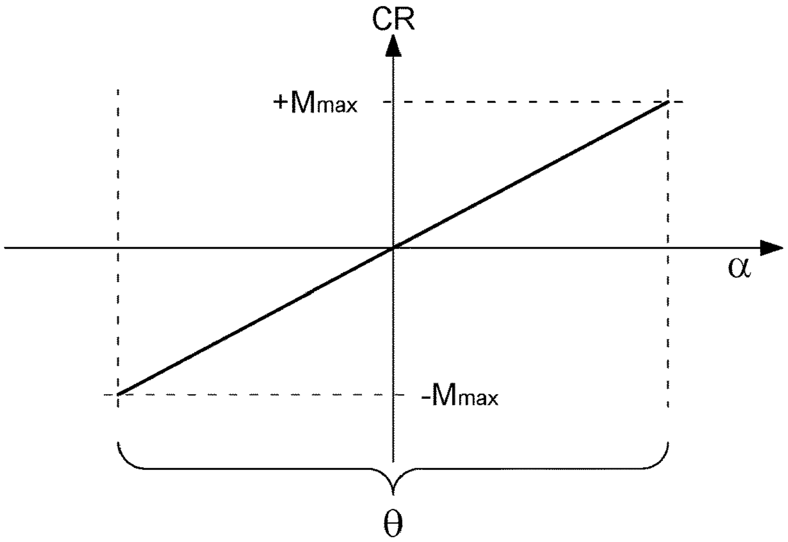
FIG. 1 is a torque diagram, for the case of a standard Swiss lever escapement, with the curve showing the oscillator return torque which is directly mounted on the escapement wheel on the ordinate, as a function of the angle on the escapement wheel on the abscissa.

The invention relates to a timepiece escapement mechanism 100, including at least one lever 10 and at least one escapement wheel 20. This at least one lever 10 is arranged to cooperate, on the one hand, with an inertial mass 40 of a mechanical oscillator 400 and is subjected, directly or indirectly, to the action of elastic return means 50 included in this mechanical oscillator 400. And this at least one lever 10 is arranged to cooperate, on the other hand, at pallets 1 carried by or included in this lever 10, with teeth 2 included in this at least one escapement wheel 20.

According to the invention, at least one said pallet 1 and/or at least one said tooth 2 includes an impulse zone including two zones, one for an angular portion where said elastic return means tend to drive said escapement wheel 20, and the other for another angular portion where said elastic return means 50 tend to oppose said escapement wheel 20, said two zones being arranged so as to minimise the maximum moment of the elastic return means seen by said escapement wheel 20.

More particularly, each said pallet 1 and/or each said tooth 2 includes an impulse zone including two zones, one for an angular portion where said elastic return means tend to drive said escapement wheel 20, and the other for another angular portion where said elastic return means 50 tend to oppose said escapement wheel 20, said two zones being arranged so as to minimise the maximum moment of the elastic return means seen by said escapement wheel 20.

FIG. 1 shows the case of an escapement of the prior art, for example a "standard" Swiss lever escapement, in particular and without limitation as described in the Illustrated Professional Dictionary of Horology, by M. G-A Berner, © Federation of the Swiss Watch Industry FH, article 1660 F, where the curve showing in ordinate the return torque CR of the oscillator directly mounted on the escapement wheel, as a function of the angle on the escapement wheel in abscissa, has the shape of a straight line between moment values which are symmetrical: +Mmax, and −Mmax.

The angle range of the escapement wheel corresponds to the half angle between two teeth θ=360°/number of teeth/2: this is the angle of advance of the wheel during an alternation of the oscillator, when the oscillator travels through the angle of lift.

It is seen that in the left half of the angle range, the oscillator return torque (e.g. the balance-spring torque) helps the lever to be displaced (negative torque), therefore the wheel does not need to exert any torque to displace the lever. However, in the right half of the angle range, the return torque of the oscillator returns the lever to its intermediate position, therefore, the wheel must exert more and more torque to displace the lever (positive and increasing torque). The "intermediate position" here refers to the position of the lever when the inertial mass of the oscillator is in its equilibrium position: in this position, the elastic return means, such as a spiral spring, or else flexible guides, do not exert any force or torque on the lever.

Figure 2:
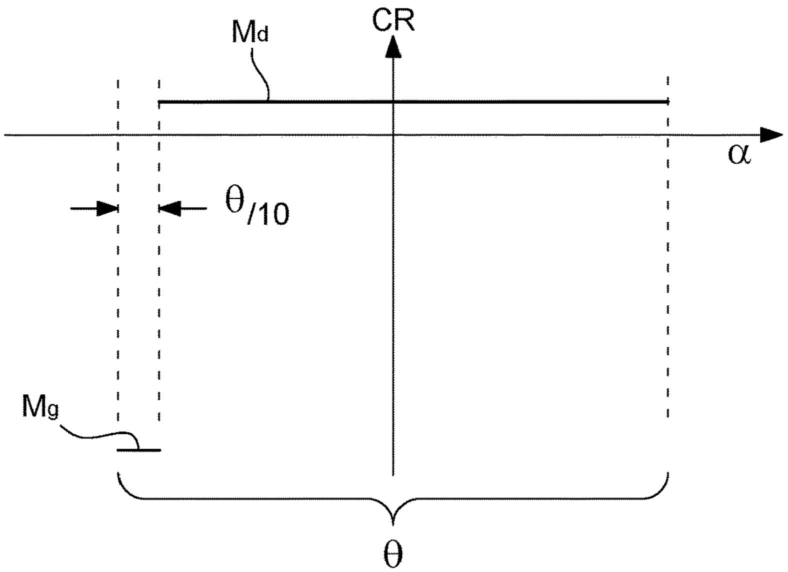
FIG. 2 is a torque diagram proposed to be produced by an escapement mechanism according to the invention.

The aim of the invention is to propose pallet and tooth profiles such that the oscillator return torque CR which is directly mounted on the escapement wheel is close to the shape shown in FIG. 2:

- a small angle range on the left, where the return torque of the oscillator which is directly mounted on the wheel is strongly negative; in this range, the elastic return means of the oscillator help the lever to move forward, therefore the wheel has no torque to overcome;
- all the rest of the angle range where the torque is approximately constant, positive.

Energy reasoning allows showing that by doing this, the torque required for the wheel to displace the lever will be in the range of up to four times lower than in the prior art. Indeed, in the case where the friction coefficients are zero, the mechanical energy is conserved. This means that the integral of the torque over the angle, at the escapement wheel, must be equal to the elastic energy Eel in the oscillator return spring when the oscillator exits the angle of lift.

In the prior art, the integral of the torque over the angle of the escapement wheel has the value Mmax/2×θ/2 (area of each of the 2 left and right triangles in FIG. 1), $$\text{therefore } M\max/2\times\theta/2=Eel,$$

$$\text{so } M\max=4Eel/\theta,$$

$$\text{and } \theta=4Eel/M\max.$$

In the case of the invention, two cases are to be dealt with separately for the moment values Mleft (labelled MI in FIG. 2) and Mright (labelled Mr in FIG. 2):

- in the left range, the energy calculation gives: Mleft×θ/10=−Eel, therefore Mleft=−10Eel/θ=−2.5 Mmax
- and, in the right range, Mright×θ×9/10=Eel, therefore Mright=10/9×Eel/θ=approx. ¼ Mmax.

In the case where the friction coefficients are non-zero, these calculations are more complicated, but the rule "the torque required for self-starting becomes lower if it is managed that the oscillator restoring torque which is directly mounted on the wheel is constant" generally remains valid.

Figure 3:
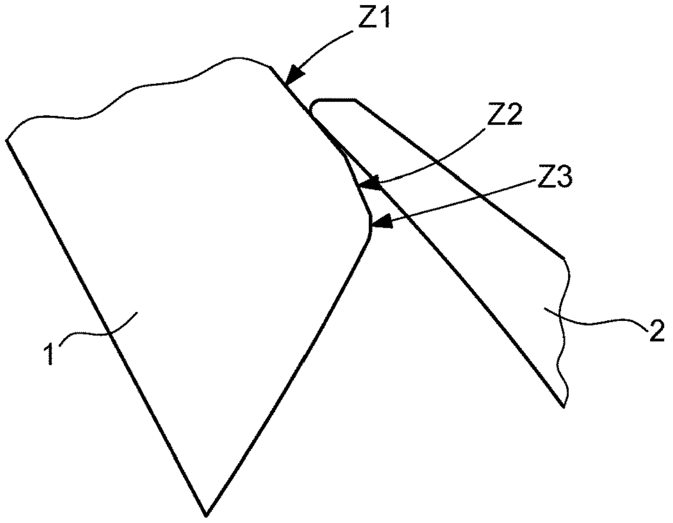
FIG. 3 represents, schematically, partially and in plan view, on the left side, a lever pallet, and on the right side a tooth of the escapement wheel bearing on this lever pallet; the pallet includes an evolving profile according to the invention, which is suitable for obtaining a torque diagram similar to that of FIG. 2, and which includes a succession of three zones: a rest plane, connected at a first edge to a "balance driving" plane, connected at a second edge to a "constant torque" curved surface, these particular designations are not limiting, and concern the particular and non-limiting case of a balance-spring type oscillator.

It is therefore a question of defining an appropriate geometry for the pallets (or teeth), so that the return torque of the oscillator which is directly mounted on the wheel is approximately constant. FIG. 3 shows, on the left side, a lever pallet 1 and, on the right side, a tooth 2 of the escapement wheel 20 bearing on this lever pallet 1. The pallet 1 includes an evolving profile according to the invention, which is suitable for dealing with this problem, and which includes a succession of three zones:

- a first zone Z1, including in particular and without limitation a rest plane;
- a second zone Z2, where the elastic return means 50 of the oscillator 400 tend to drive the escapement wheel; more particularly when the oscillator is a balance-spring assembly, this second zone Z2 is a "driving balance" surface, in particular and without limitation a "driving balance" plane;
- a third zone Z3, where the elastic return means of the oscillator tend to oppose the escapement wheel; more particularly when the oscillator is a balance-spring assembly, this third zone Z3 is, without limitation, a "constant torque" surface. The tooth beak 2 of the escapement wheel 20 impels the lever 10 over this entire third zone Z3. Once the tooth beak reaches the heel of the pallet 1, the impulse on the tooth 2 begins, where the "plane" of the tooth 2 pushes on the heel of the pallet.

Figure 4:
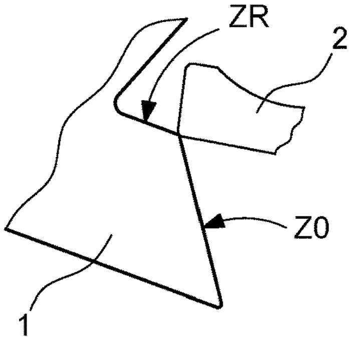
FIG. 4 represents, similarly to FIG. 3, the case of a standard lever pallet, and shows, on the left, a standard lever pallet, and on the right, a tooth of the escapement wheel bearing on the edge of this standard pallet, which separates the initial rest plane and the impulse plane.

FIG. 4 shows, on the left, a standard lever pallet 1, with a rest plane ZR and an impulse plane Z0, and on the right, a tooth 2 of the escapement wheel 20 bearing on the edge of this standard pallet, which separates the rest plane ZR and the impulse plane Z0.

Figure 6:
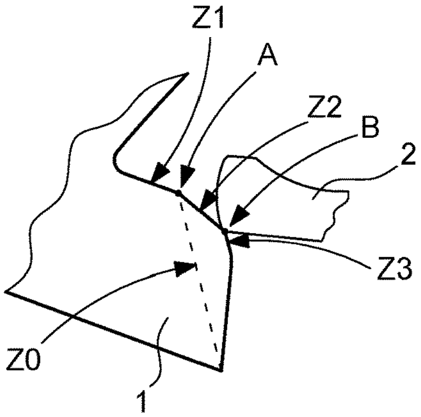
FIG. 6 represents, similarly to FIG. 3, the case of a lever pallet according to the invention, and shows, on the left, a pallet according to the invention, and on the right, a tooth of the escapement wheel bearing on the second edge of this pallet, which separates two impulse zones: the "driving balance" plane where the elastic return means of the oscillator tend to drive the escapement wheel, and the "constant torque" curved surface where these elastic return means tend to oppose the escapement wheel. The profile of the standard pallet in FIG. 4 is drawn superimposed, in broken line, with its initial rest plane and its impulse surface. The rest plane of the pallet according to the invention is identical to that of the standard pallet of FIG. 4, whereas the single impulse plane of the standard pallet is replaced for the pallet according to the invention by two parts, the first part after the rest plane corresponds to the angular portion where the balance-spring, or the flexible guide as the case may be, of the oscillator, helps the escapement wheel to move the lever, and the following part which corresponds to the angular portion where the balance-spring, or the flexible guide, opposes the escapement wheel to move the lever.

FIG. 6 illustrates a pallet 1 according to the invention.

The first zone Z1 according to the invention is the traditional resting plane ZR of a standard lever pallet.

The second zone Z2 is connected to the first zone Z1 at a first edge A. In a particular case, the second zone Z2 and the first zone Z1 are planar and form a dihedron.

The third zone Z3 is connected to the second zone Z2 at a second edge B. In a particular case which is not illustrated, the second zone Z2 and the third zone Z3 are planar and form a dihedron. In another particular case, which is not illustrated, the third zone Z3 is formed by two planar surfaces which form a dihedron.

Figure 5:
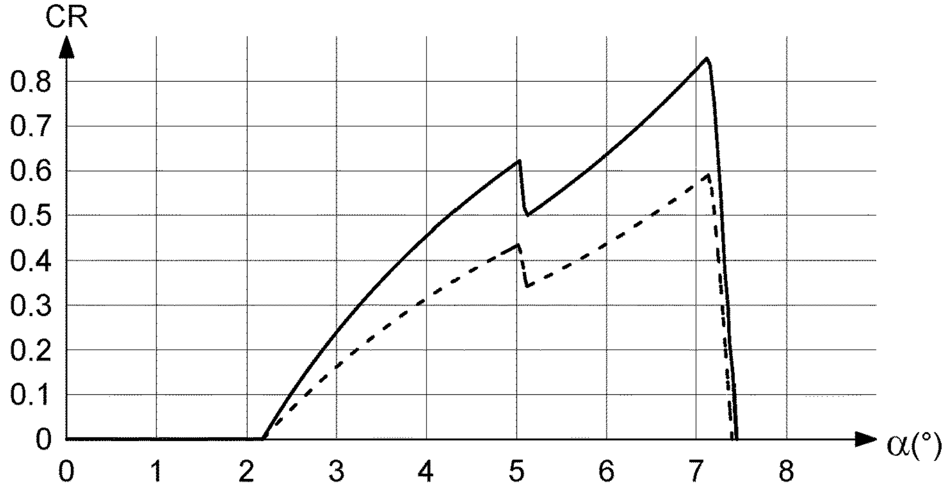
FIG. 5 shows the evolution of the torque, on the ordinate, as a function of the angle to the escapement wheel on the abscissa, for the standard pallet of FIG. 4; this figure shows, on the one hand, an ideal case without friction represented by a dashed line, and on the other hand, a case with a coefficient of friction of 0.15 represented by a solid line.
Figure 7:
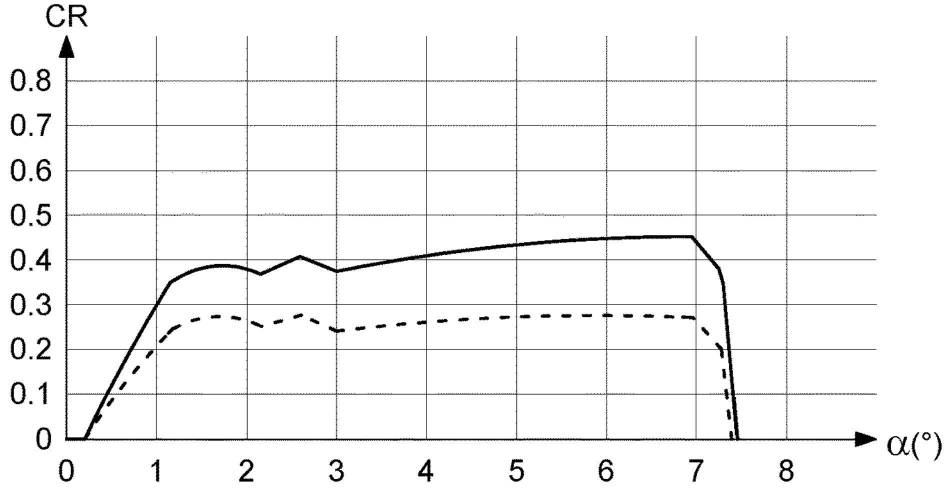
FIG. 7, similarly to FIG. 5, shows the evolution of the torque, on the ordinate, as a function of the angle to the escapement wheel on the abscissa, for the pallet according to the invention in FIG. 6; this figure shows, on the one hand, an ideal case without friction represented by a dashed line, and on the other hand, a case with a coefficient of friction of 0.15 represented by a solid line.

Different simulations allow drawing the curves of FIGS. 5 and 7, which show the evolution of the torque, on the ordinate, as a function of the angle at the escapement wheel, on the abscissa:

- the curve in FIG. 5 for the standard pallet in FIG. 4;
- the curve in FIG. 7 for the pallet according to FIG. 3 specific to the invention.

FIGS. 5 and 7 show, on the one hand, an ideal case without friction represented by a dashed line and, on the other hand, a case with a coefficient of friction of 0.15 represented by a solid line.

For the standard pallet in FIG. 4, FIG. 5 shows the torque diagram from the simulation, the "negative" torque of the spiral which is directly mounted on the wheel is not shown, because the tooth of the wheel is not "glued" to the pallet. The maximum torque is approximately 0.59 without friction (0.85 with friction coefficient 0.15) (in arbitrary units).

FIG. 6 shows, on the left, a pallet according to the invention, and on the right, a tooth of the escapement wheel bearing on the second edge B of this pallet, which separates the second zone Z2 from the third zone Z3. The profile of the standard pallet in FIG. 4 is drawn superimposed, in a dashed line, with the impulse surface Z0 thereof, the rest plane ZR thereof being constituted here by the first zone Z1. It can clearly be seen that the pallet of the lever according to the invention is, all things being equal, lengthened relative to the standard pallet, and that the impulse plane Z0 of the standard pallet is replaced by a composite surface resulting from the juxtaposition of the second zone Z2 and the third zone Z3. More particularly, the third zone Z3 includes at least one planar surface or, even more particularly, is planar.

The right side of FIG. 7 shows the torque diagram of the solution according to the invention: optimised pallet (+tooth): the maximum torque is approximately 0.29 without friction (0.45 with friction coefficient 0.15) (in arbitrary units for the torque). The desired torque smoothing is obtained, and this both in a theoretical variant without friction and in a variant close to actual conditions with a coefficient of friction of 0.15.

The relative gain at the moment of the return torque CR is close to a factor 2, and less than the expected factor 4. The reasons are:

- the real impulse is not as symmetrical as in the diagrams;
- the "lever—escapement wheel" transmission ratio changes at the end of the impulse (when passing from a "tooth beak—pallet plane" contact to a "tooth plane—pallet beak" contact), which is already going in the direction of the optimisation on a standard pallet.

Figure 8:
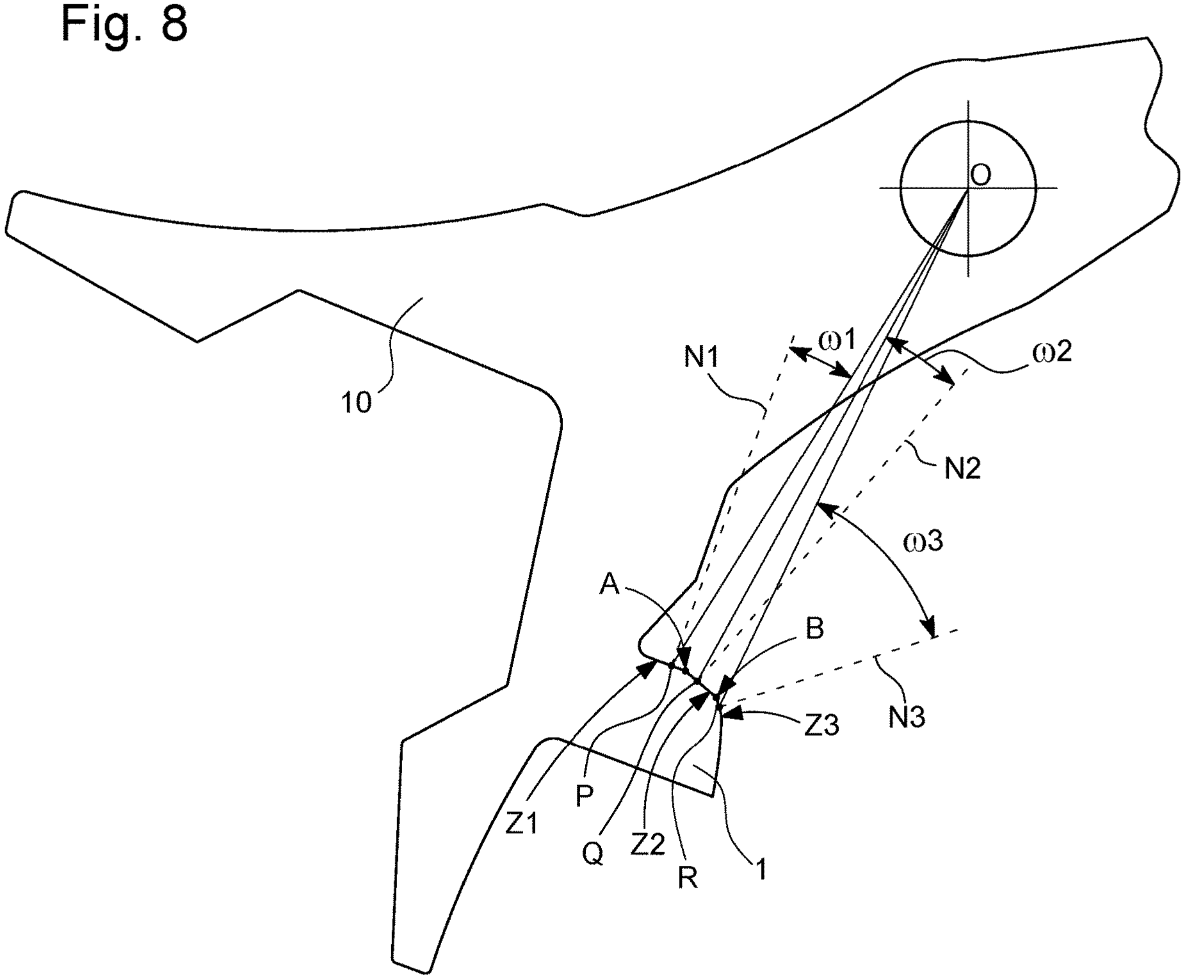
FIG. 8 shows a schematic plan view of a detail of a lever according to the invention; this figure shows, for some of the surfaces of the pallet, the normal to this surface in a dashed line, and the radial straight line joining the pivot axis of the lever to the middle of this surface, in a solid line. It shows the direction and the value of the different angles, the choice of which is important for achieving the objective of the invention.
Figure 9:
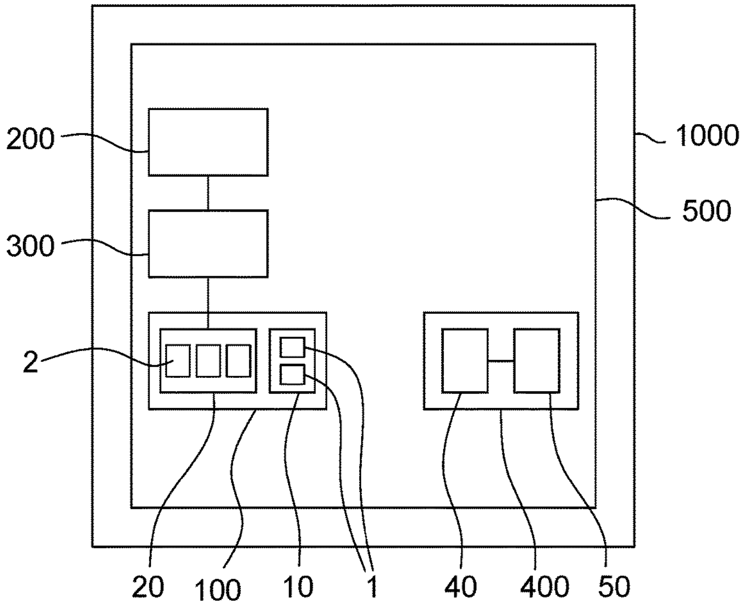
FIG. 9 is a block diagram representing a timepiece, in particular a watch, containing a movement which includes energy storage and distribution means and a gear train arranged to transmit the energy to an escapement mechanism which includes a lever and an escapement wheel according to the invention, and a mechanical oscillator with an inertial mass returned by elastic return means, said inertial mass being arranged to cooperate with said lever.

FIG. 8 illustrates a geometric configuration suitable for this simulation. For each of the surfaces, the tangent to the curve is drawn in the middle of the concerned contact zone, and from this point:

- a normal to the curve (and therefore perpendicular to this tangent) is drawn in broken line, and
- a radial straight line joining the pivot axis of the anchor to this point, is drawn in solid line.

The angle going from the normal to the radial does not always have the same direction. An angle going in the trigonometric direction in the figure is referred to here as positive, and an angle going in the opposite direction is referred to as negative.

More particularly:

- in a first zone Z1, in particular but without limitation a first plane, a first angle ω1, formed between, on the one hand, a first normal N1 to the first zone Z1 at a median point P of this first zone Z1 and, on the other hand, a first radial OP joining the pivot axis O of the lever to this point P, is negative; the torque is of negative direction;
- in a second zone Z2, in particular but without limitation a second plane, a second angle ω2, formed between a second normal N2 to the second zone Z2 at the median point Q of the second zone Z2 and a second radial OQ joining the pivot axis O of the lever to this point Q, is positive; the torque is of positive direction;
- in a third zone Z3, which is a curved surface in the variant illustrated by the figures, but which could also, without limitation, include at least one third plane, one third angle ω3 formed between a third normal N3 to the third zone Z3 at the median point R of the third zone Z3 and one third radial OR joining the pivot axis O of the lever to this point R is positive; the torque is of positive direction.

Even more particularly, the second angle ω2 between the second normal N2 and the second radial OQ is less than a tan (μ), where μ is the coefficient of friction between at least one pallet 1 and at least one tooth 2, the notation "a tan" meaning the tangent arc. The coefficient of friction μ is preferably comprised between 0.10 and 0.30. More particularly, the coefficient of friction μ is comprised between 0.12 and 0.24. Even more particularly, the coefficient of friction μ is equal to 0.2; the angle ω1 between the normal N1 and the radial OQ is then less than a tan (0.2).

Even more particularly, the third angle ω3 between the third normal N3 and the third radial OR is greater than a tan (μ). The coefficient of friction μ is preferably comprised between 0.10 and 0.30. More particularly, the coefficient of friction μ is comprised between 0.16 and 0.24. Even more particularly the coefficient of friction μ is equal to 0.2; the angle ω1 between the normal N1 and the radial OQ is then greater than a tan (0.2).

It is understood that this geometry can be applied to both the pallets of the lever and the teeth of the escapement wheel.

The pallets can be fastened on the oscillator (frictional rest).

The special profile described here can be fitted to the escapement wheel tooth.

More particularly, the contact between a lever pallet 1 and a tooth 2 of the escapement wheel 20 includes at least three zones, a first zone, called rest zone, where the torque is of negative direction, where the angle between the normal to the contact and the radial of the lever is negative, a second zone corresponding to the first half angle of lift, where the torque is of positive direction, where the angle is positive and of a value less than a predefined value, and a third zone corresponding to the second half angle of lift, where the torque is of positive direction, where the angle is positive and has a limited value greater than this predefined value.

More particularly, this predefined value is a tan (0.2) in the case of a coefficient of friction μ equal to 0.20, and would be a tan (0.15) in the case of the simulations in FIGS. 5 and 7 with a coefficient of friction μ equal to 0.15.

The invention further includes a horological movement 500, in particular and without limitation as described by the Illustrated Professional Dictionary of Horology, by M. G-A Berner, © Federation of the Swiss Watch Industry FH, article 3091 A, including at least energy storage and distribution means 200 and a gear train 300 arranged to transmit the energy to at least one such escapement mechanism 100, and at least one mechanical oscillator 400 with at least one inertial mass 40 returned by elastic return means 50, said inertial mass 40 being arranged to cooperate with said at least one lever 10.

More particularly, said mechanical oscillator 400 is a balance-spring oscillator.

Naturally, the invention applies to the case where the pallet 1 is made of a material other than the lever 10 itself, which may allow adjusting the optimum coefficient of friction μ. More particularly, at least one pallet 1 is directly mounted on a body included in the lever 10, and is made of a material other than that of this lever body.

More particularly, said mechanical oscillator 400 is a flexibly guided oscillator with at least one inertial mass 40 suspended by thin elastic blades constituting the elastic return means 50 of the oscillator 400.

The invention also includes a timepiece 1000, in particular a watch, including at least one such horological movement 500.

The invention claimed is:

1. A timepiece escapement mechanism, comprising:

a lever; and an escapement wheel, said lever being arranged to cooperate with an inertial mass of a mechanical oscillator, and subjected, directly or indirectly, to an action of an elastic return device included in said mechanical oscillator, and said lever being arranged to further cooperate, at pallets carried by or included in said lever, with teeth included in said escapement wheel, wherein at least one said pallet and/or at least one said tooth includes an impulse zone including two zones, one zone for an angular portion where said elastic return device tends to drive said escapement wheel, and the other zone for another angular portion where said elastic return device tends to oppose said escapement wheel, said two zones being arranged so as to minimize a maximum moment of said elastic return device seen by said escapement wheel, and wherein a contact between the at least one said pallet and the at least one said tooth includes three zones, a first zone where a torque is of negative direction, where a first angle formed between a first normal to the contact and a first radial of the lever is negative, a second zone corresponding to a first half angle of lift where the torque is of positive direction, where a second angle formed between a second normal to the contact and a second radial of the lever is positive, and a third zone corresponding to a second half angle of lift where the torque is of positive direction, where a third angle formed between a third normal to the contact and a third radial of the lever is positive.

2. The timepiece escapement mechanism according to claim 1, wherein, in said second zone corresponding to the first half angle of lift where the torque is of positive direction, said second angle between said second normal to the contact and said second radial of the lever is positive and of a value which is less than a predefined value, and in said third zone corresponding to the second half angle of lift where the torque is of positive direction, said third angle between said third normal to the contact and said third radial of the lever is positive and of limited value which is greater than said predefined value.

3. The timepiece escapement mechanism according to claim 2, wherein said predefined value is atan (μ), where μ is a coefficient of friction between the at least one said pallet and the at least one said tooth.

4. The timepiece escapement mechanism t according to claim 3, wherein said coefficient of friction μ is comprised between 0.10 and 0.30.

5. The timepiece escapement mechanism according to claim 4, wherein said coefficient of friction μ is equal to 0.2.

6. The timepiece escapement mechanism according to claim 1, wherein the at least one said pallet is directly mounted on a body included in said lever, and is made of a material other than that of said body of said lever.

7. The timepiece escapement mechanism according to claim 1, wherein said timepiece escapement mechanism is self-starting.

8. The timepiece escapement mechanism according to claim 7, wherein said timepiece escapement mechanism is a Swiss lever escapement.

9. The timepiece escapement mechanism according to claim 7, wherein said timepiece escapement mechanism is a coaxial escapement.

10. A horological movement including at least energy storage and distribution device and a gear train arranged to distribute energy to at least one escapement mechanism according to claim 1, and at least one mechanical oscillator including at least one inertial mass returned by an elastic return device, said inertial mass being arranged to cooperate with said at least one lever.

11. The horological movement according to claim 10, wherein said mechanical oscillator is a balance-spring oscillator.

12. The horological movement according to claim 10, wherein said mechanical oscillator is a flexibly guided oscillator with at least one said inertial mass suspended by elastic blades constituting said elastic return device of said mechanical oscillator.

13. A timepiece comprising at least one horological movement according to claim 10.

14. The timepiece according to claim 13, wherein the timepiece is a watch.

* * * * *